Patented Sept. 11, 1923.

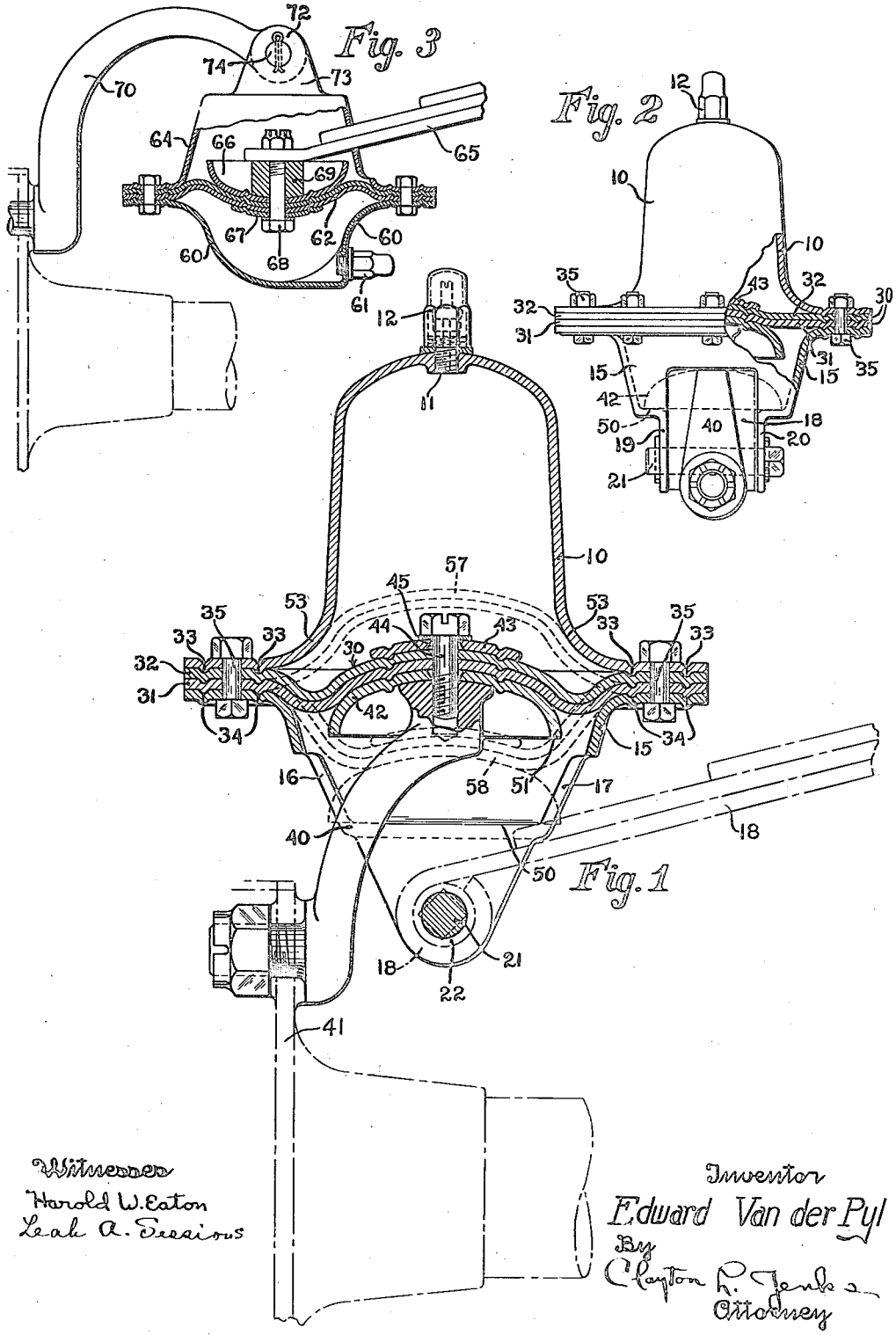

1,467,986

UNITED STATES PATENT OFFICE.

EDWARD VAN DER PYL, OF WORCESTER, MASSACHUSETTS, ASSIGNOR TO AEROBELLE COMPANY, A CORPORATION OF MASSACHUSETTS.

PNEUMATIC SHOCK ABSORBER.

Application filed March 27, 1922. Serial No. 547,149.

*To all whom it may concern:*

Be it known that I, EDWARD VAN DER PYL, a citizen of the United States of America, residing at Worcester, in the county of Worcester and State of Massachusetts, have invented certain new and useful Improvements in Pneumatic Shock Absorbers, of which the following is a full, clear, and exact specification.

My invention relates to shock absorbers and more particularly to pneumatic devices for use on motor vehicles for absorbing the shocks and vibrations which a car body would receive while traveling rapidly over a public highway.

Various types of pneumatic shock absorbers have been proposed for this purpose, but heretofore only that kind involving a dash pot containing a movable piston has been found to be a commercial success, and owing to the difficulty experienced in making the piston air tight, this type of shock absorber has been used only on the heavier and higher priced cars because of the expensive construction involved. Pneumatic devices have also been proposed, in which the air is held under compression, without the necessity of constant replenishing of the air pressure, by means of a flexible walled container, such as a flexible ball or a metal casing having a flexible diaphragm stretched across its open end.

Such ball and diaphragm shock absorbers have not taken into account the various types of movements and the direction and magnitude of the forces to which the flexible wall is necessarily subjected when employed to absorb the shocks received by a fast moving car. Since these forces are often large and the available flexible materials relatively weak, it is necessary that the air cushion be capable of absorbing the maximum shocks quickly and with but little movement of the flexible material.

I have found that such a construction involving the use of a diaphragm should be so made that the diaphragm is supported in a substantially plane position, when the forces thereon are balanced, as when the car is standing still. The diaphragm should not have a deep fold or loop of material returning closely on itself, but should be a substantially flat disk, except as it becomes distorted during usage, and be so supported as to permit adequate relative movement of the parts of the shock absorber with the least strain, abrasion or disrupting movement of the fibres of the diaphragm material. Moreover, side thrusts on the diaphragm should not be so resisted as to develop tensional strains too severe for the fibres to stand. I have further found that in such devices, which employ either a ball of flexible material or a flexible diaphragm closing the mouth of a metal casing, provision must be made for permitting free sideways movements of the vehicle body and for absorbing the horizontal as well as the vertical thrusts. Otherwise, an objectionable shock is had as the vehicle sways from side to side and the construction parts adapted to resist such movement soon become worn and loose and produce noise and discomfort to the occupants of the vehicle. It also is essential that the more delicate parts of the device be protected from the weather and be so arranged that if wetted by splashing the water will readily run off and do no damage.

It is accordingly an object of my invention to overcome or minimize the difficulties heretofore experienced by employing the principles above outlined in making a pneumatic shock absorber of the diaphragm type.

It is a further object to so construct and arrange the parts of a shock absorber, comprising an air container having a deformable wall, relative to the vehicle parts which it is to connect, that side as well as downward movements of the vehicle body may be freely permitted and the shocks incident thereto absorbed.

It is a still further object to provide a simply designed, inexpensive device capable of absorbing shocks to a high degree, which may be built in various sizes but is particularly adapted for the lighter cars, thus giving such cars the advantages of an air cushion shock absorber in preference to the mechanical spring devices heretofore employed.

With these and further objects as will be apparent in the following disclosure, my invention resides in the combination of parts set forth in the specification and covered by the claims appended hereto.

Referring to the drawing in which like reference numerals indicate like parts:

Figure 1 is a vertical section of my preferred form of shock absorber as applied to a motor vehicle;

Fig. 2 is an elevation of the same, partly broken away to show the substantially plane diaphragm as initially installed in the device; and Fig. 3 is a modification showing a reverse arrangement of parts with the air chamber beneath the diaphragm.

In accordance with my invention, I provide a pneumatic shock absorber for a vehicle having a relatively movable car body and running gear in which an impervious air container, having a wall of flexible deformable material, is so constructed and arranged relative to the vehicle parts that the container may swing freely about a pivot and absorb horizontal as well as vertical thrusts incident to the shocks of the road. This is accomplished preferably by pivotally mounting the air container on one of the vehicle parts and supporting the flexible wall rigidly on the other part, so that the air container will rock from side to side and permit free horizontal movement of the vehicle body. In the specific embodiments of my invention illustrated in the drawings, I have shown only the diaphragm type of shock absorber which comprises a flat diaphragm of flexible air-impervious material fastened across the open end of a hollow casing and fixed at its center portion to a support mounted on one of the relatively movable parts of a car. The air casing is likewise supported on the other part of the car preferably through a single flexible joint, which may be a universal joint or a simple hinge, these members being so arranged that relative movement of the car parts causes a relative motion between the diaphragm and the casing and a bell-like swinging of the whole device.

Referring more particularly to the modification shown in Figs. 1 and 2, my preferred embodiment of this invention comprises a hollow casing which opens downwardly and has a flexible diaphragm stretched across the opening and supported rigidly from the car axle, the casing itself carrying the weight of the car body through the usual springs found in automobile construction. As illustrated, the casing 10 which is formed of suitable metal is an inverted hollow cup, preferably bell shaped in order to give a maximum diaphragm area for a small amount of contained air space within the chamber whereby a small movement of the diaphragm will cause a large variation in air pressure within the casing. This air casing is provided with an opening 11 in its upper end for the introduction of air under pressure. An ordinary type of air valve 12 such as is found on automobile tires, is shown threaded into the opening 11 of the casing, this valve, in accordance with the usual construction, being so made that air may be introduced into the casing but prevented from egress. A suitable dust cap encloses the valve mechanism.

In order to fasten a diaphragm across the open end of the air casing, I provide in the present embodiment an annular flanged member 15 which has a depending portion, as shown, substantially like a hollow truncated cone. Opposite sides of this cone are cut away at 16 and 17 to permit the diaphragm-supporting member to pass inside the cone and for permitting movement of the shock absorber relative to the springs of the car. In order to support the springs 18 which fasten to the body of the car, I may provide a joint of various types to permit either universal or limited movement, but in my preferred form, as illustrated, I utilize a flexible joint between the car body and the shock absorber which permits a transverse or bell like movement of the shock absorber as the car sways or one side of the running gear is lifted. To this end, I form depending ears 19 and 20 on the cone 15 and mount the car spring thereon by passing a bolt 21 through the two ears and a bearing 22 formed in the end of the spring 18.

The diaphragm 30 which I employ is in the shape of a substantially plane disk, as shown in Fig. 2, and is stretched across and clamped between the air casing 10 and the flanged conical shaped member 15. This diaphragm is made of material which is flexible and capable of deformation, but which must be impervious to air. As shown in the drawings, it is preferably made of two layers, the lower layer 31 of leather which is tough and resistant to strains and tensional forces, and a second layer 32 of a flexible rubber material, either separate from or cemented to the leather.

In order to retain the diaphragm firmly in position when under tensional strains, the lower portion of the casing 10 is provided with ridges 33 and the upper face of the annular flange of the conical member 15 with corresponding depressions 34. A set of bolts 35 passing through the diaphragm disk, the casing and the cone flange, with the aid of the ridges and depressions 33 and 34, are employed to hold the parts together or permit removal and replacement of the diaphragm.

While the diaphragm as originally placed in the device is a plane substantially flat disk, as shown in Fig. 2, it is inherently adapted to stretch and deform during use as is required, but such deformation will be slight, attaining a maximum condition as shown in Fig. 1, only under severe usage. In such stretched condition, it however does not have deep folds which form areas of weakness and ultimately wear out and rupture at such locations.

As an essential feature of this invention, the flexible wall of the container is mounted rigidly on one of the relatively movable parts of the car body. This is accomplished, as illustrated in Fig. 1, by supporting the diaphragm directly on the perch 40 which is rigidly bolted to the hub 41 on the rear of the car or directly to the axle on the front of the car, or as is found preferable. In order that the diaphragm may be supported rigidly on this perch 40 and yet permit it to move to a certain degree, I provide a dome-shaped member 42, the convex side of which lies against the diaphragm, and the diaphragm is clamped against this dome by a disk 43 held in place by a set screw 44. The dome and the disk are provided with suitable ridges and grooves, like the corresponding parts 33 and 34, so as to clamp the diaphragm material firmly and fixedly therebetween. Leakage of air around the screw 44 may be effectively prevented by bevelling the inner edges of the hole of the perch dome and the disk 43 so that the diaphragm material will tend to be compressed into the bevelled annular opening 45 adjacent the bolt. It will thus be seen that the diaphragm is supported by a solid metallic body 42 throughout a considerable portion of its area and that it is permitted freedom of motion only in the annular portion between the perch dome and the outer area where it is clamped to the casing.

In order to limit the movement of the diaphragm and prevent disrupting by too severe shocks thereon, I provide the truncated conical member 15 with shoulders 50 which are so positioned relative to the dome 42 that the outwardly flaring part 51 of the dome will strike against these shoulders when the casing tends to travel upwardly too far. Similarly, the bell shaped casing is so formed that the inwardly projecting curved portion 53 will be struck by the diaphragm supported by the dome beneath it when the casing tends to go down too far, the flared portion of the bell casing being so shaped as to provide a suitably curved surface for the diaphragm to rest against without being injured. The dotted outlines 57 and 58 show the diaphragm in its position of maximum movement from its normal balanced central position, it however being noted that such movement is not attained except under unusual circumstances. The shoulder 50 and portion 53 are preferably so located that the diaphragm may move relative to the casing equal distances each way from its normal central position.

A modification of this construction is shown in Fig. 3 in which the air casing 60 is in an inverted position flaring upwardly, the air being admitted through air valve 61. The diaphragm 62 is supported across the upper portion of the bell flare and fastened thereto by bolts as in the construction previously described, which clamp the diaphragm between the flared air casing and a flanged truncated cone 64 of substantially the same construction as that shown in Fig. 1. In order that the diaphragm may be held rigidly on one of the car parts and since the car body must be supported by the compressed air, in this modification I clamp the car spring 65 to the diaphragm by means of a dome 66 and washer 67 held rigidly to the end of the spring by a bolt 68 which passes through a hollow block 69 carried on the dome. The air casing is supported on the arm or perch 70 fastened suitably to the running gear of the car, and in order to permit sidewise movement of the shock absorber, the connection between the arm 70 and the device is preferably made through a hinge joint 72, which comprises ears 73 upstanding from the body 64 and a bolt 74 passing through these ears and a bearing on the end of the member 70.

It will therefore be seen that in accordance with my invention the flexible wall of the air container is supported rigidly at its central portion on a part of the car and that relative movement between the car parts will cause the casing and flexible wall to move relatively. Any transverse movement of the car body will cause the pivoted casing to swing about the pivotal bolts 21 or 74. If this pivotal joint were eliminated then the flexible wall would necessarily have to absorb transverse motions as well as up and down ones, but in my preferred construction this joint is utilized so that the rocking or tilting movement of the casing will aid in absorbing part of the shock. The air pressure will, of course, be determined by the load of the vehicle and may be adjusted at will, it being advisable that marks be placed on the relatively movable parts of the shock absorber which will show when the diaphragm is in a substantially medial position. The diaphragm is preferably supported as nearly flat as possible when the car weight is balanced by the air pressure, hence the fibres thereof are not subjected to abnormal strains except when absorbing severe shocks.

By means of this construction, the diaphragm will be protected from the weather and insured a long life of commercial practicability. The only opening between the diaphragm and the outside is downwards and substantially covered by the springs of the car so that any upward splash of water is largely prevented access to the diaphragm and any water striking it will of course fall off and not remain there. As a further feature, it is to be noted that the shock absorber may be easily installed on a car without placing parts under forced restraint, as is required with springs, air pressure of any desired extent being provided after the parts have been assembled.

Having thus described my invention, what I claim as new and desire to secure by Letters Patent is:—

1. In combination with a vehicle having two relatively movable parts, a shock absorber supporting one part on the other comprising an impervious air container having a flexible wall, a fixed connection between one vehicle part and said wall which forms the sole support for the container and a pivotal connection between the container and the other vehicle part which permits the container to swing about said support, whereby both horizontal and vertical movements of the supported vehicle part are permitted and shocks incident thereto are absorbed.

2. In combination with a vehicle having two relatively movable parts, a shock absorber supporting one part on the other comprising an impervious air container having a flexible wall, means permitting compressed air to be pumped into said container, a perch rigidly mounted on one of the vehicle parts and having an extensive surface engaging said flexible wall, and a pivotal connection between the container and the other vehicle part which permits the container to swing relative to said perch, whereby both horizontal and vertical movements of the supported vehicle parts are freely permitted and shocks incident thereto are absorbed.

3. In combination with a vehicle having two relatively movable parts, a shock absorber therebetween comprising a hollow casing open at one end, a deformable, impervious diaphragm fastened peripherally across the opening of the casing, a supporting member fastened to the center of the diaphragm and mounted rigidly on one of the vehicle parts and means connecting the casing pivotally to the other of said vehicle parts, whereby the casing may swing about said supporting member and permit horizontal movement of the vehicle part pivoted thereto.

4. In combination with a vehicle having a relatively movable body and running gear, a shock absorber therebetween comprising a hollow casing open at one end and having an inlet for compressed air, a deformable, impervious, substantially plane diaphragm fastened peripherally across the open end of the casing, a rigid member supporting the diaphragm on one of the relatively movable vehicle parts and a hinged connection between the casing and the other of the vehicle parts which permits the casing to rock transversely of the vehicle and the latter to move freely therewith.

5. In combination with a vehicle having a body and running gear, a shock absorber therebetween comprising a hollow air impervious container having a deformable wall, means permitting compressed air to be pumped into said container, a support rigidly mounted on the running gear, said support having an extensive surface engaging the deformable wall and being connected centrally thereto, and a pivotal connection suspending the body from the container which permits the latter to swing transversely as the vehicle sways.

6. In combination with a vehicle having a body and running gear, a shock absorber therebetween comprising a bell shaped casing flaring downwardly, a deformable, impervious, substantially plane diaphragm fastened peripherally across the flared opening of the casing, means permitting compressed air to be pumped into the casing, a supporting member depending from the casing, pivotal connections between said member and the body and a rigid support for the diaphragm mounted on the running gear, which permit the casing to swing relative thereto.

7. In combination with a vehicle having a body and running gear, a shock absorber therebetween comprising an air impervious hollow casing having a deformable wall, means permitting compressed air to be pumped into the casing, means cooperating with the casing to protect said wall from exposure to the weather, a fixed support for said wall mounted on the running gear and a pivotal support for the body connected with said casing which permits the latter to swing as the body sways.

8. In combination with a vehicle having a body and running gear, a shock absorber therebetween comprising an air impervious casing having a deformable wall, means permitting compressed air to be pumped into the casing, a support for said wall mounted on one of the vehicle parts, a pivotal connection between the casing and the other vehicle part which permits the casing to swing transversely about said support as the vehicle sways, and means positively limiting relative movement between the casing and the wall.

9. In combination with a vehicle having a body and a running gear, a shock absorber therebetween comprising an open ended hollow casing, a deformable, impervious, substantially plane diaphragm fastened peripherally across the open end of the casing and permitted to move by deformation relative to the casing, means positively limiting such relative movement to approximately equal distances from a normal central position for the diaphragm, a support for the diaphragm rigidly mounted on one of the vehicle parts and pivotal connections from the casing to the other vehicle part permitting a transverse rocking motion for the casing.

10. In combination with a vehicle having a body and running gear, a shock absorber therebetween comprising a bell shaped casing open at its flared end, a deformable, impervious diaphragm fastened peripherally across the open end of the casing, a diaphragm supporting member having a convex surface engaging the diaphragm and fixed centrally thereto, means to support said member rigidly on one of the vehicle parts, pivotal connections from the casing to the other of the vehicle parts permitting a transverse rocking movement of the casing, said elements being constructed and arranged to permit relative movement between the diaphragm and casing without injuriously deforming the diaphragm.

Signed at Worcester, Massachusetts, this 25th day of March, 1922.

EDWARD VAN DER PYL.